United States Patent [19]
Micklich et al.

[11] Patent Number: 5,397,458
[45] Date of Patent: Mar. 14, 1995

[54] MOVING BED REGENERATION PROCESS WITH INTERNALLY MIXED CHLORIDE GAS

[75] Inventors: Frank T. Micklich, Joliet; Paul A. Sechrist, Des Plaines, both of Ill.

[73] Assignee: UOP, Des Plaines, Ill.

[21] Appl. No.: 173,237

[22] Filed: Dec. 27, 1993

[51] Int. Cl.⁶ .................. C10G 35/12; C10G 35/085; B01J 38/44; B01J 8/12
[52] U.S. Cl. ........................ 208/140; 422/216; 422/220; 422/223; 502/35; 502/37
[58] Field of Search .............. 208/140; 502/35, 37

[56] References Cited

U.S. PATENT DOCUMENTS

| | | | |
|---|---|---|---|
| 2,908,636 | 10/1959 | Steffgen et al. | 208/140 |
| 2,965,563 | 12/1960 | Steffgen et al. | 208/140 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,986,982 | 10/1976 | Crowson et al. | 252/415 |
| 4,701,429 | 10/1987 | Greenwood | 502/37 |
| 4,832,921 | 5/1989 | Greenwood | 422/223 |
| 4,859,643 | 8/1989 | Sechrist et al. | 502/37 |
| 5,053,371 | 10/1991 | Williamson | 502/37 |
| 5,151,392 | 9/1992 | Fettis et al. | 502/37 |
| 5,227,566 | 7/1993 | Cottrell et al. | 502/35 |
| 5,277,880 | 1/1994 | Sechrist et al. | 208/140 |

*Primary Examiner*—Paul E. Konopka
*Attorney, Agent, or Firm*—Thomas K. McBride; John G. Tolomei

[57] ABSTRACT

A regeneration process and apparatus eliminates the need for an external chlorination recycle loop. The method and apparatus uses two-pass internal mixing of a chlorine compound input stream and drying gas to both mix and heat the chlorination gas before entering the chlorination zone. The only heat required for the process is a small amount for vaporizing the chlorine containing input stream to prevent the formation of chloride droplets. All other heat for the chlorination zone is supplied internally in the regeneration vessel.

11 Claims, 2 Drawing Sheets

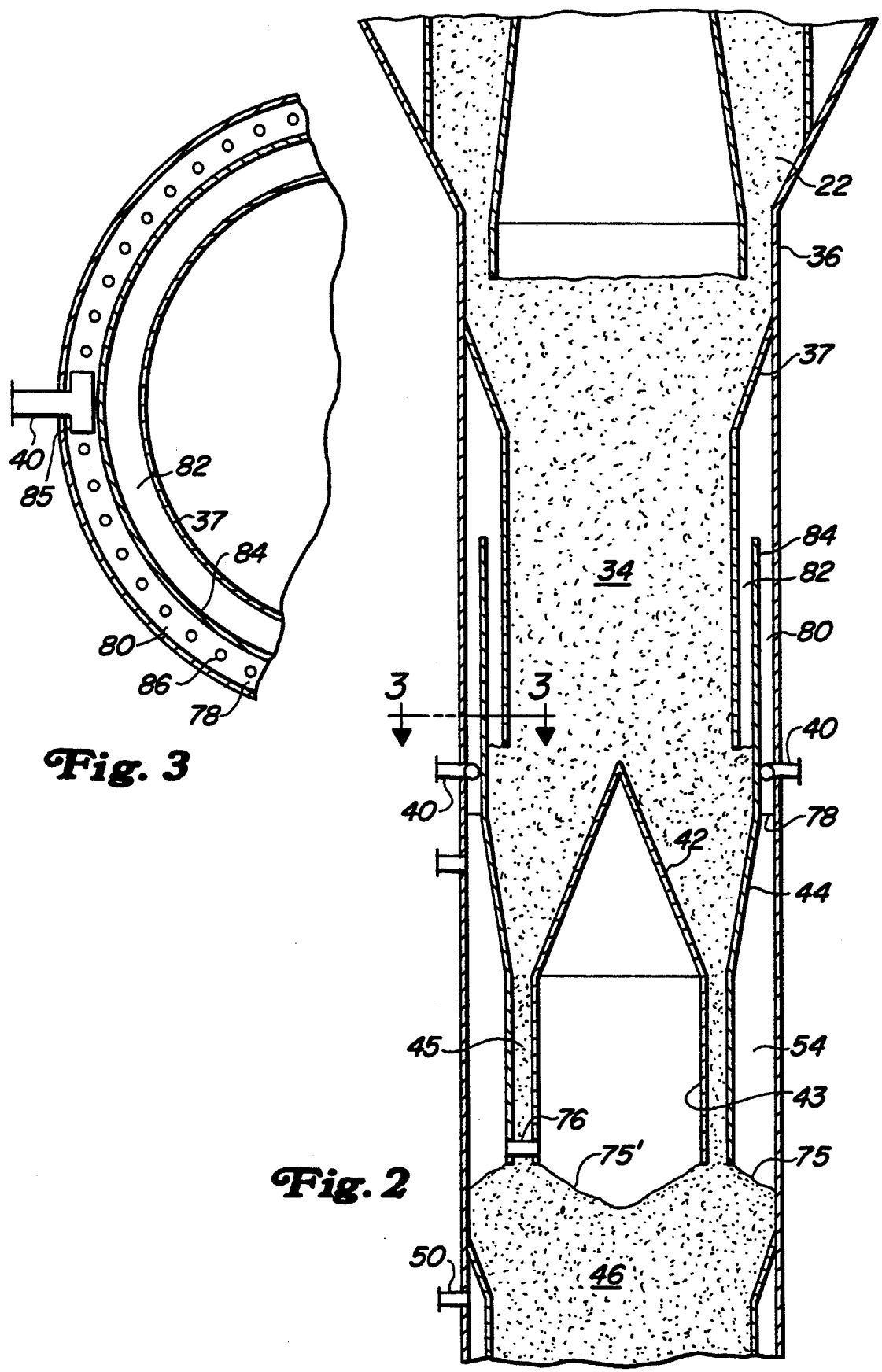

MOVING BED REGENERATION PROCESS WITH INTERNALLY MIXED CHLORIDE GAS

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalyst used in these processes become deactivated for one of more reasons. Where the accumulation of coke deposits causes the deactivation, reconditioning of the catalyst to remove coke deposits restores the activity of the catalyst. Coke is normally removed from catalyst by a regeneration operation that contacts the coke containing catalyst at high temperature with an oxygen-containing gas to combustively remove the coke. Regeneration may be carried out in-situ or the catalyst may be removed from a vessel in which the hydrocarbon conversion takes place and transported to a separate regeneration zone for coke removal. Arrangements for continuously or semi-continuously removing catalyst particles from a reaction zone for coke removal in a regeneration zone are well known.

In order to combust coke in a typical regeneration zone, a recycle gas is continuously circulated to the combustion section and a flue gas containing by-products of a coke combustion, oxygen, and water is continually withdrawn. Coke combustion is controlled by recycling a low oxygen concentration gas into contact with the coke-containing catalyst particles. The flue gas/recycle gas is continuously circulated through the catalyst particles. A small stream of makeup gas is added to the recycle gas to replace oxygen consumed in the combustion of coke and a small amount of flue gas is vented off to allow for the addition of the makeup gas. The steady addition of makeup gas and the venting of the flue gas establishes a steady state condition that produces a nearly constant concentration of water and oxygen as well as the combustion products in the recycle gas.

In continuous or semi-continuous regeneration processes, coke laden particles are at least periodically added and withdrawn from a bed of catalyst in which the coke is combusted. Regions of intense burning that extend through portions of the catalyst bed develop as the coke is combusted. After this intense burning, certain catalysts require reconditioning to restore its effectiveness. For example reforming catalysts typically contain chloride compounds and noble metals, usually platinum. These catalysts require reconditioning to restore the activity of the noble metal to its most highly catalytic state and to replace chloride on the catalyst that may be lost in the reaction zone or through the combustion of coke. Reconditioning for a reforming catalyst will include contact with a chloride containing compound, to redistribute the platinum metal and replace the chloride that may be lost from the catalyst, followed by a drying step to reduce the moisture content of the catalyst and finally a reducing step to change the platinum metal from various oxidized states to a reduced metallic condition.

A number of environmental and operational problems have been associated with these catalyst reconditioning steps. Replacing chloride on the catalyst and re-dispersing platinum over the surface of the catalyst are both done in the presence of a chloride compound. The catalyst platinum redispersion benefits from a high chlorine environment. The chlorine and hydrogen chloride in the chloride contact zone are in equilibrium with the water and oxygen present herein. This equilibrium is skewed towards higher concentrations of hydrogen chloride. In order to provide adequate chlorine for redispersion of the platinum metal, the total concentration of hydrogen chloride must be relatively high. Maintaining the high hydrogen chloride environment adds to the expense of designing the regeneration zone by requiring the recycle of hydrogen chloride-containing gas. In most cases, this recycle of the gas is done by a closed loop system, a heater, a blower and associated piping. The expense of this equipment is compounded by the fact that exotic materials are needed to withstand a hydrogen chloride environment. Moreover, gas must be vented from the halogenation loop that circulates the hydrogen chloride containing gas. This vented gas has a high concentration of hydrogen chloride and must, therefore, be vented or treated in a way that avoids damage to equipment or the environment. Another drawback associated with the high hydrogen chloride environment is that there is often more hydrogen chloride uptake on the catalyst than is necessary or desired.

This invention provides a method of reactivating a noble catalyst that has been deactivated by the accumulation of coke on its surface and requires regeneration to remove coke and contact with a chlorine containing compound to restore adequate catalytic activity. This invention is particularly suited for catalysts that use platinum metals and maintain a chloride concentration on the catalyst particles. In such cases, the arrangement and operation of this method and apparatus will improve the redispersion of platinum on the catalyst particles and allow a better control of the chloride content on the reconditioned particles. This invention can also reduce emissions and handling problems associated with hydrogen chloride containing gases and can reduce the overall expense of operating a regeneration zone for the reconditioning of such catalyst particles.

INFORMATION DISCLOSURE

U.S. Pat. No. 3,652,231 (Greenwood et al.) shows regeneration apparatus in which a constant-width movable bed of catalyst is utilized. The '231 patent also describes a continuous catalyst regeneration process which is used in conjunction with catalytic reforming of hydrocarbons. U.S. Pat. No. 3,647,680 (Greenwood et at.) and 3,692,496 (Greenwood et al.) also deal with regeneration of reforming catalyst. The teachings of patents ('231,'680, and '496) are hereby incorporated in full into this patent application.

U.S. Pat. Nos. 2,908,636 and 2,965,563 issued to Steffgen et al. disclose basic steps for the regeneration of reforming catalyst.

U.S. Pat. No. 3,986,982 issued to Crowson et at. teaches the completion of reforming catalyst regeneration with a final step.

U.S. Pat. Nos. 5,151,392 and 4,701,429 disclose a regeneration vessel having an arrangement of baffles to form annular gas distribution spaces.

SUMMARY OF THE INVENTION

This invention is a process for catalytically reforming hydrocarbons that regenerate the hydrocarbon conversion catalyst in a regeneration zone. The invention internally mixes and heats a chlorine compound containing gas stream for contacting a catalyst undergoing regeneration. The invention mixes a gas stream containing a chlorine compound with a drying gas in a series of baffles to both internally mix and heat the chlorine compounds with the drying gas before entering a dense bed chlorination zone. The internal mixing and heating simplifies the process by eliminating the need for expensive external piping and equipment. This piping and equipment was expensive since it was designed to handle a relatively large volume of gas containing a substantial concentration of high temperature HCl. Eliminating equipment that must withstand high temperature HCl eliminates substantial cost from the regeneration vessel and the operation of the regeneration process.

The invention achieves these results with a two-pass baffle system in which the mixture of the chlorine compound containing gas and drying gas are mixed. The gas stream containing the chlorine compound contacts the drying gas in a first pass along a first direction flow path. The mixture then reverses directions at least once to pass along an additional path before entering the dense bed of catalyst undergoing chloriding treatment. The gas containing the chlorine compound, hereinafter called chlorinating gas, is turbulently mixed with the drying gas that enters an upstream portion of the first flow path defined by the baffle system. The turbulence generated by the vapors of the chlorinating gas contacting the drying gas initiate uniform mixing of the chlorinating stream and drying gas. The change of direction of travel along a second flow path insure that a well-mixed combination of the drying gas containing oxygen and vapors from the chlorinating gas exit the baffle system to contact the dense bed of catalyst in the chlorination zone. Oxygen carded into admixture with the chlorination gas supplies the necessary input of oxygen for the combustion of coke from the catalyst particles prior to entering the chlorinating step. Thus using the combination of drying gas and two-pass mixing through the baffle system to supply the chlorination gas to the chlorination zone effects three results: the chlorination gas is mixed; the chlorination gas is heated, and the chlorination gas from the chlorination zone supplies the necessary oxygen input to the recycle gas of the combustion zone.

Accordingly, in one embodiment this invention is a process for reforming a hydrocarbon feedstock. The process comprises passing the hydrocarbon feedstock to a catalytic reforming reaction system and contacting the feedstock with reconditioned catalyst particles comprising a noble metal and a chloride compound and recovering the hydrocarbon product. Deactivated catalyst particles are at least semi-continuously removed from the reaction system and reconditioned particles added to the reforming reaction system. Deactivated catalyst particles flow from the reforming reaction system to a regeneration zone that contacts the deactivated particles having coke deposited thereon in a combustion section of a regeneration zone with an oxygen-containing gas to remove coke and to produce coke depleted catalyst particles. The coke depleted catalyst particles pass downwardly to form a dense bed chlorination zone. A chlorine compound input stream is injected into a moisture containing drying gas to produce a chlorination gas. The chlorination gas passes through a first mixing space in a first direction and then through a second mixing space in a second direction which is opposite to the first direction. The chlorination gas then flows into a lower portion of a dense bed chlorination zone to produce chlorided catalyst particles. The chlorination gas passes upwardly from the dense bed chlorination zone into admixture with spent combustion gas from the combustion section to supply a portion of the oxygen required for the combustion of coke. The chlorided catalyst particles pass downwardly to form a dense bed drying zone and drying gas containing oxygen passes upwardly from the dense bed drying zone into contact with the chlorine compound input stream.

In another embodiment this invention is an apparatus for regenerating chloride containing catalyst particles. The apparatus comprises a vertical regeneration vessel having an outer vessel wall. The regeneration vessel defines a combustion section and includes means for adding deactivated catalyst particles to the combustion section and contacting deactivated catalyst particles with combustion gas in the combustion section to produce coke depleted catalyst particles and spent regeneration gas. An upper chamber defined by the regeneration vessel collects the spent regeneration gas and includes means for withdrawing spent regeneration gas from the chamber. A chlorination section in the regeneration vessel contains a chlorination chamber defined in part by an inner chlorination baffle. The chlorination section includes means for receiving coke depleted catalyst particles from the combustion section to produce chlorided catalyst particles and communicating gas from the chlorination section to the upper chamber. An outer chlorination baffle extends within the regeneration vessel and is coextensive with the inner chlorination baffle to define an outer mixing chamber between the vessel wall and the outer chlorination baffle and an inner mixing chamber between the outer chlorination baffle and the inner chlorination baffle. The chlorination section has means for communicating a chlorination gas from the outer mixing chamber through the inner mixing chamber and to the chlorination chamber. The regeneration vessel defines a drying section located below the chlorination chamber for contacting chlorided catalyst particles with a drying gas. Means are provided for passing the drying gas into the outer mixing chamber and introducing a chlorine compound containing stream into the outer mixing chamber to produce the chlorination gas. Means are also provided for passing chlorided catalyst particles from the chlorination chamber into the drying section to produce dried catalyst particles and for withdrawing dried catalyst particles from the regeneration vessel.

Other objects, embodiments and advantages of this invention are disclosed in the following detailed description.

BRIEF DESCRIPTION OF THE DRAWINGS

FIG. 2 is an enlarged view of a mid-portion of the regeneration vessel shown in FIG. 1.

FIG. 3 is a horizontal section of FIG. 2 showing a plan view of a particular baffle arrangement and a distribution "T" for practicing a specific embodiment of this invention.

DETAILED DESCRIPTION OF THE INVENTION

Figure 1:
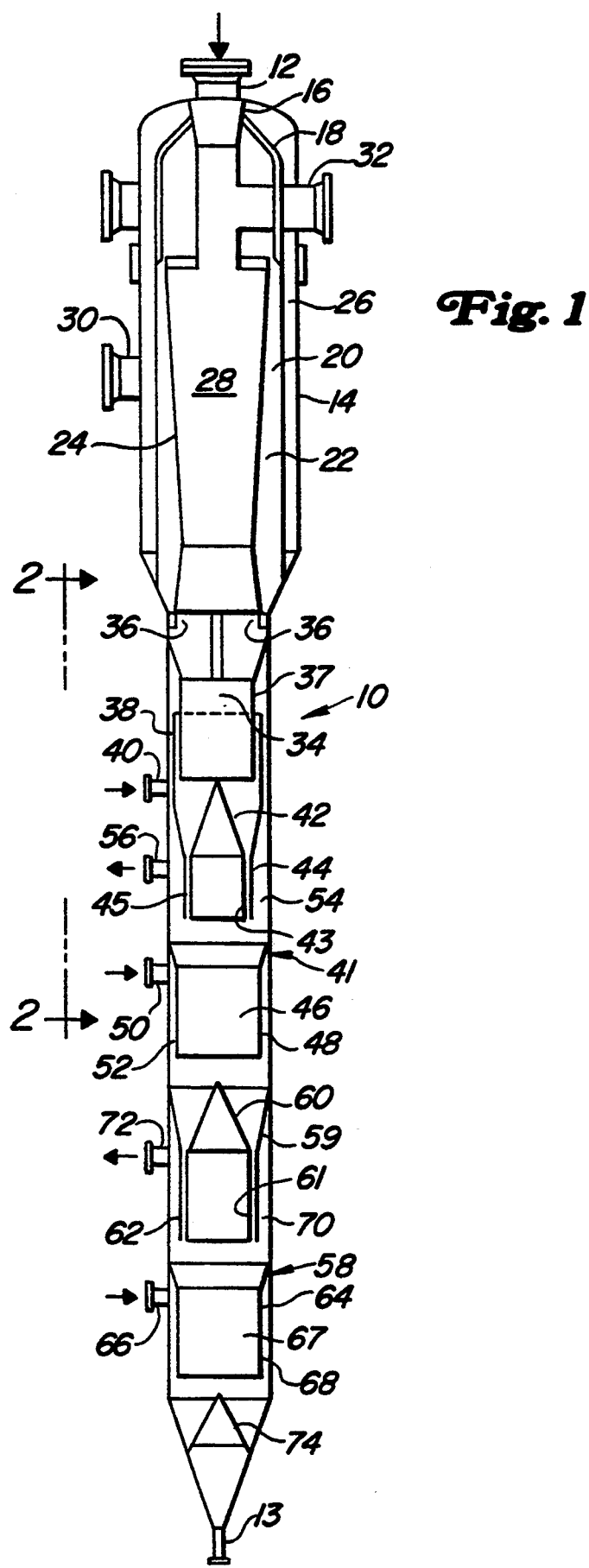
FIG. 1 is a sectional elevation that schematically illustrates a regeneration vessel of this invention and its internal arrangement.

In its broadest aspects, this invention may be used to recondition any noble metal containing catalyst that loses activity by the accumulation of coke thereon and requires regeneration by the removal of coke and contacting with a chlorine compound containing gas stream. This invention is particularly suited for catalysts that use platinum metals and maintain a chloride concentration on the catalyst particles. In such cases the arrangement and operation of this method and apparatus will simplify the regeneration operation and reduce the cost associated with depositing chloride compounds on the reconditioned particles.

The most widely practiced hydrocarbon conversion process to which the present invention is applicable is catalytic reforming. Therefore the discussion of the invention contained herein will be in reference to its application to a catalytic reforming reaction and regeneration system. It is not intended that such discussion limit the scope of the invention except as set forth in the claims.

Catalytic reforming is a well established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et at.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 $m^2/g$. The particles are usually spheroidal and have a diameter of from about 1/16th to about ⅛th inch (1.5–3.1 mm), though they may be as large as ¼th inch (6.35 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reforming operation will employ a moving bed reaction zone and regeneration zone. The present invention is applicable to a moving bed regeneration zone and a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

When using the method of this invention in a batch, continuous, or semi-continuous catalyst regeneration process, catalyst is contacted with a hot oxygen-containing gas stream (known in reforming processes as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dioxide, and water. Coke content of spent catalyst may be as much as 20% of the catalyst weight, but 5–7% is a more typical amount. Within the combustion zone, coke is usually oxidized at temperatures ranging from 850°–1000° F., but temperatures in localized regions may reach 1100° F. or more.

Oxygen for the combustion of coke enters what is called a combustion section of the regeneration zone in what has been termed a recycle gas. The recycle gas contains a low concentration of oxygen usually on the order of 0.5 to 1.5% by volume. The arrangement of a typical combustion section may be seen in U.S. Pat. No. 3,652,231. A preferred form of the combustion zone uses screens to contain the coke containing catalyst particles in a tapered bed configuration while combustion gas passes radially through the bed. This configuration is disclosed in U.S. Pat. No. 4,859,643 the contents of which are incorporated by reference. As the coke is combusted, the small amount of hydrogen within the coke reacts with the oxygen to form water. Flue gas made up of carbon monoxide, carbon dioxide, water, unreacted oxygen, chlorine, hydrochloric acid, nitrous oxides, sulfur oxides and nitrogen is collected from the combustion section and withdrawn from the regeneration zone as flue gas. Thus, the recycle gas and flue gas form a recycle gas loop wherein flue gas is continually withdrawn from the process mixed with an oxygen-containing gas to replenish consumed oxygen and returned to the combustion section as recycle gas. A small amount of the flue gas is vented off from the process to allow the addition of an oxygen-containing gas called makeup gas. The oxygen-containing gas is combined with the flue gas to replace the oxygen consumed by the coke combustion and the combined gas is recycled to the combustion section. In the past, the oxygen-containing gas was typically air. The amount of air needed in past regeneration processes to replenish the oxygen consumed during the coke combustion is relatively small, usually about 3% of the volumetric rate of the recycle gas stream.

After coke has been combusted from the catalyst, it is passed to a chlorination zone. The chlorination uptake zone provides a chlorine containing compound that will react with hydroxyl groups on the catalyst support to provide active chloride on the catalyst. Preferably, the catalyst composition will have a chloride concentration in a range of from 0.4 to 1.4 wt. % and more preferably from 0.8 to 1.2 wt. %. The function of the chlorination zone is to transfer chloride to the catalyst and redisperse platinum on the catalyst. Therefore, the chlorination uptake zone is maintained at conditions that will provide chlorine and chloride compounds such as hydrogen chloride. Hydrogen chloride or other chlorine compound containing gas is transferred into the chlorination zone with an oxygen containing gas stream to provide a chlorination gas. Preferably, the oxygen content in the chlorination gas will have a concentration of from 10 to 21 mol. %. Preferably, the chlorination zone will have a temperature of from 400°–1100° F., and more preferably between 800°–1000° F.

After the chlorination zone, the chlorided catalyst particles enter a drying zone where the water that is left on the catalyst particles after the combustion process is removed. Water is evaporated from the surface and pores of the catalyst particles by contact with a heated gas stream. Any gas stream that can absorb water from the catalyst particles can be used in the drying zone. The drying gas, typically air, is preferably heated to a temperature of between 800°–1100° F. to reduce the moisture content of the catalyst particles to acceptable levels. Drying of the air stream before it is heated will increase the desorption of water from the catalyst particles and decrease the size of the drying zone. It is preferable that the drying gas stream contain sufficient oxygen so that any final residual burning of coke from the inner pores of catalyst particles may be accomplished in the drying zone, and excess oxygen passes upwardly from the drying zone. In a preferred form of this invention, the drying gas will have an oxygen concentration that is at least roughly equal to that of air. In a preferred embodiment, all or a portion of the drying gas will be oxygen-enriched so that there will be a high oxygen concentration in the drying zone that will promote complete combustion of any residual coke left in the catalyst. The drying zone should be designed to reduce the moisture content of the catalyst particles to at least 0.1 wt. % based on catalyst weight before the catalyst particles leave the drying zone.

The regeneration process and apparatus may include an additional zone for cooling catalyst particles. The catalyst cooling zone will be located below the catalyst drying zone and would receive hot catalyst particles from the drying zone and cool them to a temperature in a range of from 100° to 500° F. and more preferably in a range of from 250° to 350° F. The cooling gas normally comprises air that enters a lower portion of the cooling zone and after direct heat exchange by contact with the catalyst leaves an upper portion of the cooling zone.

This specific arrangement and operation of a regeneration process and apparatus that incorporates this invention can be better understood by reference to FIG. 1 through 3. These figures describe a specific embodiment of a particular application of this process and apparatus in the reconditioning of reforming catalyst. The description of this invention in the context of a specific example and regeneration zone arrangement is not intended to limit the broad scope of the invention as presented in the claims. The drawings show only elements and equipment that are essential to a clear understanding of the invention. The application and use of additional required items is well within the purview of one skilled in the art. U.S. Pat. Nos. 3,625,321; 3,647,680 and 3,692,496 provide additional details of equipment and methods for operating reforming regeneration zones.

FIG. 1 provides a general overview of the regeneration process and regeneration apparatus. Spent catalyst particles containing about 5 wt. % coke are introduced into a regeneration vessel 10 through a nozzle 12. Catalyst exits the regenerator through a bottom nozzle 13. The withdrawal of catalyst from bottom nozzle 13 controls the flow rate of catalyst through the system and may be either continuous or intermittent. The arrangement of the apparatus provides a continuous downward catalyst flow path through the regeneration vessel. The entire volume of the continuous catalyst flow path remains full of catalyst during the operation of the regeneration zone.

Regeneration vessel 12 has an upper combustion section 14. Deactivated catalyst particles are distributed from an upper hopper 16 at the top of combustion section 14 and distributed through a plurality of conduits 18 into a catalyst bed 20. In preferred form, the regeneration vessel 10 is cylindrical and catalyst bed 20 has the configuration of an extended annulus. An outer cylindrical screen 22 and an inner cylindrical screen 24 retain the deactivated catalyst particles in the preferred arrangement of an extended annular bed. Preferably, one or both of screens 22 and 24 give the bed a tapered configuration. An annular space just inside the shell of regeneration vessel 10 and to the outside of screen 22 defines an inlet chamber 26 for receiving an oxygen-containing regeneration gas. The volume to the inside of screen 24 provides a central collection chamber 28. Oxygen-containing regeneration gas or recycle gas enters inlet chamber 26 through a nozzle 30, flows essentially radially through bed 20 and exits the combustion section from the collection chamber through an upper nozzle 32 located in an upper portion of combustion section 14. Removal of coke by combustion produces coke depleted catalyst particles.

In a preferred form combustion section 14 passes deactivated catalyst downwardly from bed 20 into a chlorination zone 34 that holds catalyst as a dense bed. In preferred form catalyst passes from screen outlets 36 into an open volume defined by a downwardly extending chlorination baffle 37 that forms a dense bed drying zone. A chlorination gas comprising a mixture of a chlorine compound input stream and a drying gas passes through a two pass baffle system 38 before entering the bottom of dense bed chlorination zone 34. The chlorine compound input stream enters baffle system 38 through a nozzle 40. Preferably the chlorine input stream is in vapor form to prevent the entry of acid droplets into the baffle system. A small vaporizing heater may be added upstream of nozzle 40 to insure that the chlorine compound input stream is fully vaporized. The addition of the heater imposes only minor expense on the system due to the relatively small gas flow through nozzle 40.

Chlorination gas, after contact with the catalyst particles in dense bed chlorination zone 34, passes upwardly into central collection chamber 28. As the chlorination gas passes into upper collection chamber 28, it furnishes oxygen to the spent regeneration gas for return to the combustion zone with the recycle gas to thereby supply the oxygen needed for further combustion of coke from the catalyst particles.

Chlorided catalyst from dense bed 34 flows downwardly around a conical baffle 42 and into an annular holdup zone 45 defined by a lower cylindrical portion 43 of conical baffle 42 and a lower cylindrical portion of truncated conical baffle 4-4. An annular volume of catalyst retained between baffles 44 and 43 provides a gas seal to limit the flow of drying gas upwardly through the catalyst particles into bed 34. Catalyst particles that leave annulus 45 form a central dense bed drying zone 46 defined by a lower drying baffle 48.

A drying gas enters the drying zone 46 via nozzle 50 and flows downwardly through an annulus 52 defined by the wall of vessel 10 and the outside of lower drying baffle 48. Annulus 52 distributes the drying gas around the circumference of central dense bed drying zone 46. The drying gas takes up moisture as it passes upwardly through drying zone 46. Pressure drop provided by annulus 45 forces the majority of the upward flowing drying gas into an annulus 54. The space to the inside of the shell of vessel 10 and the outside of upper drying baffle 44 defines annulus 54. Most of the moisture laden drying gas flows upwardly out of annular space 54 and into baffle system 38. Control of the drying gas into baffle system 38 is regulated by restricting the flow area from space 54 into the baffle system 38. The drying zone usually requires more drying gas than is necessary to supply oxygen to the combustion section via the chlorination zone; therefore, nozzle 56 withdraws any amounts of drying gas that are in excess of those required in the chlorination zone.

Following drying, the dried catalyst particles from drying zone 41 may continue to pass downwardly into a cooling zone 58. An upper cooling baffle 59 and a conical cooling baffle 60 with a central cylindrical portion 61 receives dried catalyst particles from drying zone 41 and hold dried catalyst particles in an annulus 62 defined between cylindrical portion 61 and the inside of upper cooling baffle 59. A central dense bed of dried catalyst 67 is defined by a central portion of a drying baffle 64. The dense bed of catalyst receives catalyst from annulus 62. Cooling gas enters the regeneration vessel through a nozzle 66 and flows downwardly through an annular space 68 to distribute cooling gas over the entire perimeter of the dense bed cooling zone. Cooling gas flows upwardly through the dense bed 67 and pressure drop created by the buildup of catalyst particles in annular space 62 diverts the majority of the cooling gas into an annular space 70 from which a nozzle 72 withdraws the cooling gas from the regeneration vessel. Cooled catalyst particles from the cooling zone pass downwardly, around a conical baffle 74 and out of the regeneration vessel through nozzle 13.

A better understanding of the baffle system 38 as depicted in FIG. 1 can be obtained from FIG. 2 which shows an enlarged central portion of the regeneration vessel from FIG. 1. Catalyst flows into the central dense bed 34 of the chlorination section from annular bed 22 through radial bed outlet 36. Catalyst flows around conical baffle 42 and through annulus 45 formed, in the manner previously described by upper drying baffle 44 and the lower cylindrical portion 43 of conical baffle 42. Catalyst then flows downward from annulus 45 into the central portion of dense bed drying zone 46.

Drying gas flows from nozzle 50 through dense bed drying zone 46 and upwardly from an upper bed surface 75. The cylindrical baffle 43 in the annular holdup zone 45 (and annular zone 62 as well) is open only at its bottom and prevents gas flow upwardly out of the central area of each zone. In order to achieve desired gas and catalyst contacting in a conical volume of catalyst at the bottom of each open space, a small port is placed at a lower portion of the annular zone to allow gas flow from the volume surrounded by each annular zone to the outer annulus that collects gas from each zone. This port permits gas flow through the entire cross-section of the bed. Looking specifically at FIG. 2, a portion of the drying gas is vented out of bed surface 75' into the central portion of cylindrical baffle 43 by one or more conduits 76. The conduits 76 are located at the bottom of annulus 45 and communicate gas from the interior of conduit 43 into annular space 54 to prevent non-uniform gas and catalyst contacting as described above.

Moisture containing drying gas continues to pass upwardly through annular space 54 and across a partition 78 that restricts flow between annulus 54 and an outer mixing chamber in the form of an outer annular chamber 80. As the drying gas passes upwardly through a plurality of openings in partition 78, the chlorine compound containing stream is injected out of nozzle 40 and into direct contact with the drying gas. An upwardly extending chlorination baffle 84 is interposed between downwardly extending chlorination baffle 37 and the wall of the regeneration vessel to define an outer annular mixing chamber 80 and an inner annular mixing chamber 82. Contact between the gas streams in chamber 80 causes rapid mixing to form the chlorination gas that continues to pass upwardly through outer annular mixing chamber 80 and into inner mixing chamber 82. The upward and downward flow of chlorination gas through the baffle system of baffles 82 and 84 provide two-pass mixing. In order to improve initial mixing between the chlorine compound input stream, it is preferably injected into the drying gas at least two locations. Again, in order to improve the mixing of the chlorine compound input stream with the drying gas, it enters the outer mixing chamber at a velocity of at least 10 ft/sec and preferably in a range of from 100 to 200 ft/sec.

The preferred form of injecting the chlorine compound input stream into the outer mixing chamber is shown in FIG. 3. In this preferred form, partition 78 is a flat plate defining a plurality of restriction orifices. Restriction orifices are sized to produce a pressure drop of at least 0.20 psi and more preferably, a pressure drop in a range of from 0.20 to 0.40 psi for the flow passing through the baffle plate. This pressure drop creates small jets of drying gas. A pipe connection at the end of nozzle 40 preferably in the form of a "T" 85 directs the flow of the chlorine compound input stream in a circumferential direction that is perpendicular to the direction of the jets formed by orifice openings 86. Injecting the chlorine compound input stream in a direction perpendicular to the jets creates turbulence that enhances the initial mixing of the gas streams to provide a more well-distributed chlorination gas.

Internally mixing the moisture laden drying gas from the top of the drying zone with the chlorine compound input stream in the manner described herein eliminates the former heat loss associated with the withdrawal of drying gas and the external addition of a chlorine compound to an external recycle loop. With the elimination of the external recycle loop, heat loss is reduced to the point that no additional heating of the chloride supply stream, apart from vaporization heat, is needed. Thus, the addition of the internal baffle and circulation of drying gas directly from the drying zone eliminates the piping and heaters associated with the recycle loop without any significant expense to the process.

We claim:

1. A process for reforming a hydrocarbon feedstock, said process comprising:
   a) passing said hydrocarbon feedstock to a catalytic reforming reaction system and contacting said feedstock with reconditioned catalyst particles comprising a noble metal and a chloride compound and recovering a hydrocarbon product;
   b) at least semi-continuously removing deactivated catalyst particles from said reforming reaction system and adding reconditioned catalyst particles to said reforming reaction system;
   c) passing deactivated catalyst particles from said reforming reaction system to a regeneration zone;
   d) contacting deactivated catalyst particles having coke deposited thereon in a combustion section of said regeneration zone with an oxygen-containing gas to remove coke by combustion and to produce coke depleted catalyst particles and produce spent regeneration gas;
   e) passing said coke depleted catalyst particles downwardly to form a dense bed chlorination zone, injecting a chlorine compound input stream into a moisture containing drying gas to produce a chlorination gas, passing said chlorination gas through a first mixing space in first direction, through a second mixing space in a second direction, opposite said first direction, and into a lower portion of said dense bed chlorination zone to produce chlorided catalyst particles;
   f) passing said chlorination gas upwardly into admixture with said spent combustion gas to supply a portion of the oxygen required for combustion of coke in step d);
   g) passing chlorided catalyst particles downwardly to form a dense bed drying zone;
   h) passing a drying gas into said dense bed drying zone to produce dried catalyst particles and said moisture-containing drying gas and passing said moisture containing drying gas upwardly from said dense bed drying zone into contact with said chlorine compound input stream as described in step d); and,
   i) withdrawing dried catalyst particles from the bottom of said regeneration zone.

2. The process of claim 1 wherein a portion of said moisture containing drying gas is withdrawn from said regeneration zone before said moisture containing drying gas contacts said chlorine compound input stream.

3. The process of claim 1 wherein said chlorine compound input stream enters said regeneration zone at at least two separate points.

4. The process of claim 1 wherein said chlorine compound input stream enters said regeneration zone at a velocity of at least 10 ft/sec.

5. The process of claim 1 wherein said moisture containing drying gas passes through a restriction orifice before contacting said chlorine compound input stream and said restriction orifice produces a pressure drop of at least 0.20 psi to form a jet of moisture containing drying gas.

6. The process of claim 1 wherein said chlorine compound input stream is directed into contact with said moisture containing drying gas in a direction perpendicular to said jet.

7. A process for reforming a hydrocarbon feedstock, said process comprising:
   a) passing said hydrocarbon feedstock to a catalytic reforming reaction system and contacting said feedstock with reconditioned catalyst particles comprising a noble metal on an alumina carrier and a chloride compound and recovering a hydrocarbon product;
   b) at least semi-continuously removing deactivated catalyst particles from said reforming reaction system and adding reconditioned catalyst particles to said reforming reaction system;
   c) passing deactivated catalyst particles from said reforming reaction system to a regeneration zone;
   d) contacting deactivated catalyst particles having coke deposited thereon in a first section of said regeneration zone with an oxygen-containing gas to remove coke by combustion and to produce coke depleted catalyst particles and produce spent regeneration gas, said oxygen-containing gas having an oxygen concentration of from 0.5 to 5% by volume;
   e) passing said coke depleted catalyst particles downwardly to form a dense bed chlorination zone, injecting a chlorine compound input stream into a moisture containing drying gas to produce a chlorination gas, passing said chlorination gas upwardly through a first annular space, downwardly through a second annular space and into a lower portion of said dense bed chlorination zone to produce chlorided catalyst particles having a chloride concentration of from 0.4 to 1.4 wt. %;
   f) passing said chlorination gas upwardly into admixture with said spent combustion gas to supply at least a portion of the oxygen required for combustion of coke in step d);
   g) passing chlorided catalyst particles downwardly to the bottom of the dense bed chlorination zone into a first annular holdup zone to cream an at least partial gas seal;
   h) passing chlorided catalyst particles downwardly from said first annular holdup zone to form a dense bed drying zone;
   i) passing a drying gas into a third annular space surrounding said dense bed drying zone, downwardly directing said drying gas through said third annular space into a lower portion of said dense bed drying zone, passing said drying gas upwardly through said dense bed drying zone to produce dried catalyst particles and said moisture-containing drying gas, passing said moisture containing drying gas upwardly from said dense bed drying zone into a fourth annular space surrounding said first annular holdup zone and passing said moisture containing drying gas out of an upper portion of said fourth annular space and into contact with said chlorine compound input stream as described in step e);

j) passing said dried catalyst particles downwardly into a second annular catalyst holdup zone to create an at least partial gas seal;

k) passing dried catalyst particles from said second catalyst holdup zone downwardly into a dense bed cooling zone bed;

l) passing a cooling gas into a fifth annular space surrounding said dense cooling zone bed, downwardly directing cooling said gas through said fifth annular space, passing cooling gas into a lower portion of said dense cooling zone and passing said cooling gas upwardly through said dense cooling zone to cool said dried catalyst particles and produce cooled catalyst particles;

m) collecting cooling gas from said cooling zone dense bed in a sixth annular space surrounding said second annular catalyst holdup zone and withdrawing cooling gas from said regeneration zone; and, n) withdrawing cooled catalyst particles from the bottom of said regeneration zone.

8. The process of claim 7 wherein a portion of said moisture containing drying gas is withdrawn from said regeneration zone before said moisture containing drying gas contacts said chlorine compound input stream.

9. The process of claim 7 wherein said chlorine compound input stream is divided into at least two separate streams that enter opposite sides of said first annular space in a circumferential direction.

10. The process of claim 7 wherein said chlorine compound input stream enters said regeneration zone at a velocity in a range of from 100 to 150 ft/sec.

11. The process of claim 7 wherein said moisture containing drying gas passes through a plurality of restriction orifice before contacting said chlorine compound input stream, said restriction orifice produces a pressure drop in a range of from 0.20 to 0.40 psi to form jets of moisture containing drying gas that contact said chlorine compound input stream.

* * * * *

UNITED STATES PATENT AND TRADEMARK OFFICE
CERTIFICATE OF CORRECTION

PATENT NO. : 5,397,458
DATED : March 14, 1995
INVENTOR(S) : Frank T. Micklich et al.

It is certified that error appears in the above-identified patent and that said Letters Patent is hereby corrected as shown below:

In Column 12, line 59: Change "cream" to --create--.

Signed and Sealed this

Twenty-third Day of May, 1995

Attest:

BRUCE LEHMAN

Attesting Officer     Commissioner of Patents and Trademarks